US006405529B1

(12) United States Patent
Berg et al.

(10) Patent No.: US 6,405,529 B1
(45) Date of Patent: Jun. 18, 2002

(54) HYDRAULIC SYSTEM FOR UTILITY VEHICLES

(75) Inventors: Torsten Berg, Bautzen; Erich Girstenbrei, Biessenhofen, both of (DE)

(73) Assignee: Agco GmbH & Co, Marktoberdorf (DE)

( * ) Notice: Subject to any disclaimer, the term of this patent is extended or adjusted under 35 U.S.C. 154(b) by 0 days.

(21) Appl. No.: 09/617,904

(22) Filed: Jul. 17, 2000

(30) Foreign Application Priority Data

Jul. 17, 1999 (GB) .......................................... 9916713

(51) Int. Cl.[7] .......................................... F16D 31/02
(52) U.S. Cl. .......................................... 60/422; 60/468
(58) Field of Search .......................... 60/468, 452, 422

(56) References Cited

U.S. PATENT DOCUMENTS

| | | | | |
|---|---|---|---|---|
| 3,971,216 A | * | 7/1976 | Miller | 60/452 |
| 5,129,230 A | * | 7/1992 | Izumi et al. | 60/452 |
| 5,179,835 A | * | 1/1993 | Casey et al. | 60/422 |
| 5,857,331 A | * | 1/1999 | Christensen et al. | 60/422 |
| 6,134,887 A | * | 10/2000 | Bertotti et al. | 60/422 |

* cited by examiner

*Primary Examiner*—Edward K. Look
*Assistant Examiner*—Igor Kershteyn
(74) *Attorney, Agent, or Firm*—MacMillan, Sobanski & Todd, LLC

(57) ABSTRACT

A hydraulic system for a utility vehicle supplies primary and auxiliary hydraulic actuators with hydraulic fluid and includes a pump, the pressure of which is controlled with respect to the load pressure of the primary and auxiliary hydraulic actuators. The pressure of the hydraulic fluid from the pump exceeds the load pressure by a predetermined control pressure differential. Valves arc provided for producing two control pressure differentials of different values. When the prevailing load pressure of the auxiliary hydraulic actuator and a highest load pressure of the primary hydraulic actuator is less than the sum of the load pressure of the auxiliary hydraulic actuator and the control pressure differential of the auxiliary hydraulic actuator minus the control pressure differential of the primary hydraulic actuator, the control pressure differential is increased with respect to die control pressure differential in cases where the load pressure of the auxiliary hydraulic actuator does not prevail.

2 Claims, 2 Drawing Sheets

HYDRAULIC SYSTEM FOR UTILITY VEHICLES

BACKGROUND TO THE INVENTION

The present invention relates to a hydraulic system for utility vehicles, in particular agricultural tractors, for supplying pressure medium consumers, such as hydraulic actuators, that are arranged inside and/or outside of the vehicle with a pressure medium, such as a hydraulic fluid, including a control pump or at least one fixed displacement pump, the pressure of which is controlled with respect to the load pressure of the pressure medium consumers and exceeds the load pressure by a predetermined control pressure differential, the system comprising means for producing two control pressure differentials of different values.

A hydraulic system of the type mentioned above is known from the firm magazine "Hydraulik in Theorie und Praxis", Robert Bosch GmbH, 2nd revised edition, Stuttgart 1995, page 269. The system serves to supply pressure medium consumers being controlled by directional valves by means of a fixed displacement pump. The system includes a pressure scale keeping the conveying pressure of the pump (called the "pump pressure" in the following) constantly at a pressure level exceeding the corresponding load pressure by a predetermined control pressure differential. The system further includes a switching valve by means of which different control pressure differentials are provided. The switching from one control pressure differential to the other control pressure differential is realized by the switching valve being controlled by the load pressure of the actuated pressure means consumer depending on the switching position of the switching valve. The system is designed and arranged in a way that in case of non-prevailing load pressure and the directional valves being switched to the neutral position, the low control pressure differential is attained, whereas in case of opened directional valves and prevailing load pressure, the higher control pressure differential is attained. In this way, power loss when none of the pressure medium consumers is actuated is reduced.

In utility vehicles, as for example in the above-mentioned agricultural tractors, the hydraulic system supplies a majority of pressure medium consumers. Some of these consumers, called primary pressure medium consumers, are supplied by pressure medium lines fixedly arranged inside the vehicle and that work without great losses of pressure. Other consumers, called auxiliary pressure medium consumers, arc arranged in tools of all different kinds that move along with the vehicle. In case of need, they are connected to the hydraulic system by hydraulic couplings, and they are supplied by the hydraulic system. Thus, substantial losses of pressure occur inside the hydraulic couplings and inside the pressure medium lines leading to the auxiliary pressure medium consumers. The control pressure differential is increased to compensate for these pressure losses. The increase of the control pressure differential results in greater power losses in the case where no pressure medium consumers or exclusively primary pressure medium consumers are to be supplied.

It is an object of the present invention to provide a hydraulic system of the type mentioned above having minimized power losses.

The object of the present invention is achieved by the fact that, in the case of prevailing load pressure of the auxiliary pressure medium consumers and a highest load pressure of the primary a pressure medium consumers being less than the sum of the load pressure of the auxiliary pressure medium consumers and the control pressure differential of auxiliary pressure medium consumers minus the control pressure differential of the primary pressure medium consumers, the control pressure differential is increased with respect to the control pressure differential in cases where the load pressure of the auxiliary pressure medium consumers does not prevail.

Due to the adaptation of the control pressure differential to the need of the primary pressure medium consumers and to the auxiliary pressure medium consumers, respectively, it is possible to supply the consumers with a lowest possible pressure, and thereby to the power losses of the pump as low as possible.

Further details and features of the present invention are mentioned in the claims.

BRIEF DESCRIPTION OF THE DRAWINGS

In the drawings which illustrate exemplary embodiments of a hydraulic system according to the invention.

DETAILED DESCRIPTION OF THE PREFERRED EMBODIMENTS

Figure 1:
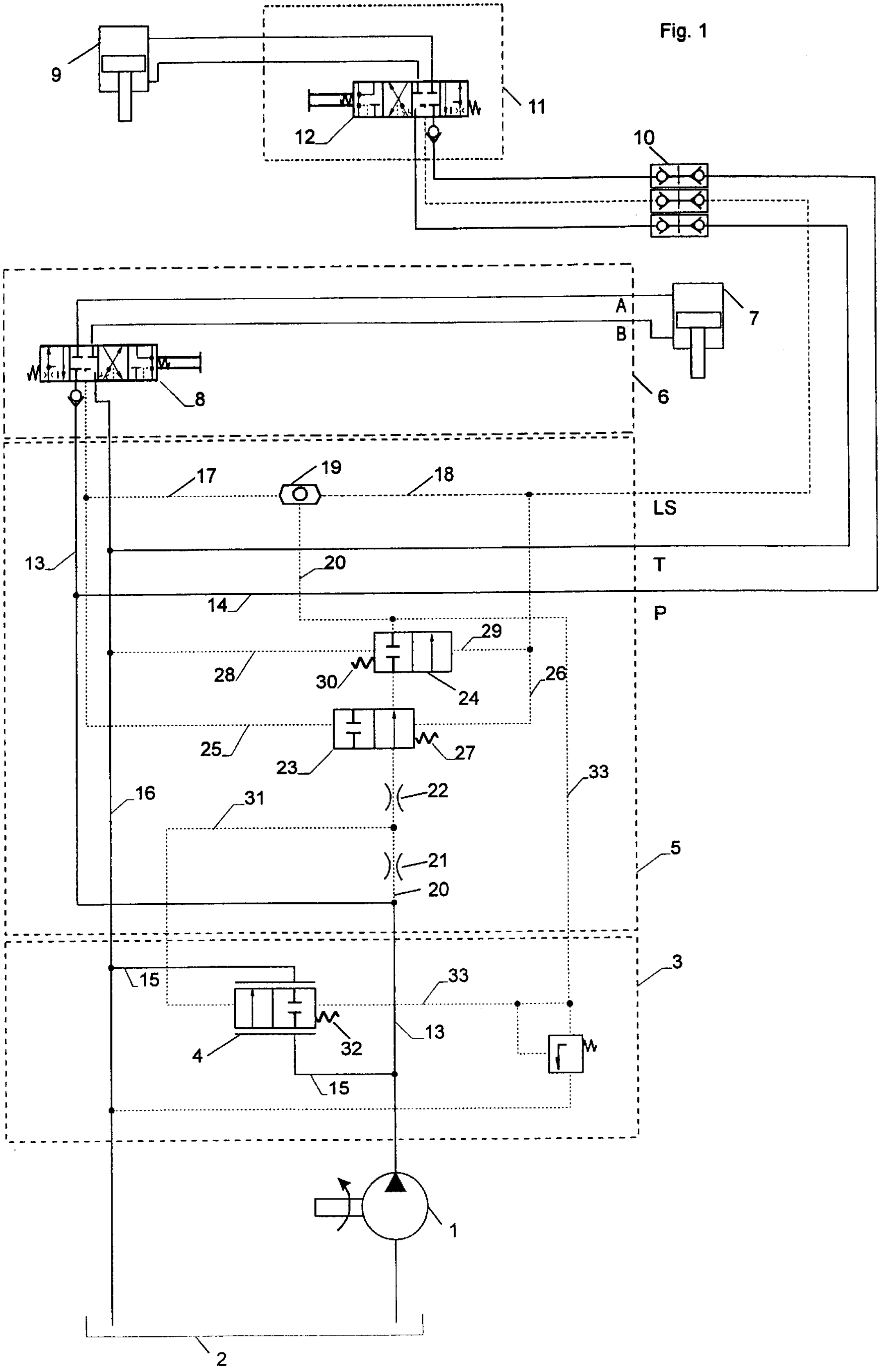
FIG. 1 illustrates a diagram of connections for a hydraulic system in which the pump pressure is controlled by manipulating the pump pressure.

The hydraulic system according to FIG. 1 includes a fixed displacement pump 1 that draws hydraulic fluid from a reservoir 2, a control device plate 3 including an unloading valve 4, a connection plate 5 and a control device 6 including connections A, B for the supply of a pressure medium, such as hydraulic fluid, to the primary pressure medium consumers 7 by a control valve 8. "Pressure medium consumers" are to be understood as single acting and double acting hydraulic actuators (linear actuators and rotating actuators) for driving different tools, as for example the power lift cylinder of the 3-point linkage for tools or the actuation cylinder, the rocker, and the loading shovel of a front loader. The control device plate 3, the connection plate 5 and the control device 6 are connected to each other by screws.

The connection plate 5 includes connections LS, T, P to supply the auxiliary hydraulic actuators 9. Hydraulic fluid lines lead from the connections LS, T, and P to control valves 12 located in an external control device 11 via hydraulic couplings 10.

The unloading valve 4 controls the pressure inside the hydraulic line 13 from die pump 1 to the control device 6 and in the hydraulic line 14 to the connection P in a way that the pressure constantly remains above the highest load pressure of the hydraulic actuators 7, 9 by a certain value called the control pressure differential. Surplus hydraulic fluid delivered by the pump 1 returns to the reservoir 2 via the hydraulic line 15 (which includes the unloading valve 4) and the return line 16. The load pressure of the primary hydraulic actuator 7 is taken via a control line 17 at the control valve 8, and the load pressure of the auxiliary hydraulic actuator 9 is taken via a control link 18 at the connection LS of the connection plate 5. The control lines 17, 18 are connected to the inlets of a shuttle valve 19. A control line 20 leads to the hydraulic line 13 from the outlet of the shuttle valve 19.

The control line 20 includes two fixed restrictions 21, 22 arranged in line, one behind the other, with a pair of two-way valves 23, 24. The two-way valve 23 is subject to the load pressure of tie primary hydraulic actuator 7 in the control line 17 via a control line 25, the load pressure of the auxiliary hydraulic actuator 9 in the control line 18 via a control line 26, and the load exerted by a spring 27. The force of the spring 27 corresponds to the differential of the control pressure differentials of the external and of the primary hydraulic actuators 7 and the auxiliary hydraulic actuators 9. Tie two-way valve 24 is connected to the return line 16 leading from the control device 6 to the reservoir 2 via a control line 28 and is subject to the force exerted by spring 30. On its other side, the two-way valve 24 is subject to the load pressure in the control line 18 via the control line 29. The force of the spring 30 is chosen to switch the two-way valve 24 into its passage position when the load pressure of the auxiliary hydraulic actuators 9 prevails in the control line 29. To control the pump pressure, the unloading valve 4, on its one side, is subject to pressure by the control line 31 branching off the control line 20 between die fixed restrictions 21, 22 and, on its other side, the unloading valve 4 is subject to the force of a spring 32 and to the highest load pressure of the primary hydraulic actuators 7 and the auxiliary hydraulic actuators 9, respectively, via the control line 33 being connected to the control line 20 by the outlet of the two-way valve 19. The force of tie spring 32 is adjusted to a value determining the control pressure differential for the primary hydraulic actuators 7, for example to 10 bar.

The function of the hydraulic system is explained with reference to the accompanying drawings.

Case No. 1: None of the hydraulic actuators 7, 9 arc actuated.

In this case, the control lines 17, 18, 20, 29 and 33 are unpressurized. The two-way valve 24 is switched into its locking position by the force of the spring 30, blocking the control line 20. The unloading valve 4 is subjected to the pressure prevailing in the control line 20 on the pump side via the control line 31. The unloading valve 4 opens completely against the force of the spring 32, so that the entire hydraulic fluid being conveyed by the pump 1 returns directly back into the reservoir 2 via tie hydraulic line 15. A pump pressure of 10 bar prevails in the hydraulic line 13. The pump pressure corresponds to a low control pressure differential for the primary hydraulic actuators 7.

Case No. 2: At least one primary hydraulic actuator consumer 7 is actuated, an no auxiliary hydraulic actuator consumer 9 is actuated.

In this case, load pressure prevails in the control lines 17, 25, and the control lines 18, 29 are unpressurized. The two-way valve 24 is switched into its position blocking the control line 20 by the force of spring 30 so that no hydraulic fluid flows in the control line 20 from the hydraulic line 13 to die control valve 8. Thus, there is no loss of pressure at the fixed restriction 21.

Consequently, the pressure inside the control line 31 corresponds to the pump pressure which is subjected to one side of the unloading valve 4, while the load pressure of the primary hydraulic actuator 7 acts via the control line 33. The force of the spring 32 adds to the load pressure. The unloading valve 4 controls die pump pressure independent of the value of the load pressure in a way that the pump pressure always exceeds the load pressure by the low control pressure differential of the primary hydraulic actuator 7. To minimize the power loss resulting from returning the unneeded hydraulic fluid via the unloading valve 4, the value of the control pressure differential is chosen as low as to be just sufficient to actuate the primary hydraulic actuator 7 satisfactorily.

Case No. 3: At least one auxiliary hydraulic actuator 9 is actuated, and no primary hydraulic actuator 7 is actuated.

In this case, load pressure prevails in the control lines 18, 20, 33, and 26, and the control lines 17, 25 are unpressurized. Both of the two-way valves 23, 24 are opened. A small volume of control hydraulic fluid flows to the control device 11 via the fixed restrictions 21, 22 and the two-way valves 23, 24 corresponding to the pressure differential between the hydraulic line 13 and the control line 20 at the outlet of the shuttle valve 19; Due to the reduction of pressure by the fixed restriction 21, pressure that is less than the pump pressure prevails in die control line 31 and on one side of the unloading valve 4. On the other side of the unloading valve 4, load pressure of the auxiliary hydraulic actuator 9, plus the force of the spring 32, prevails via the control line 31. Thus, the unloading valve 4 is closed until a new balance is attained in which the pump pressure corresponds to the sum of die load pressure and a hydraulic fluid differential being increased with respect to Case No. 2 and fulfilling the requirements of die auxiliary hydraulic actuators 9. For example, the control pressure differential is 20 bar.

Case No. 4: At least one primary hydraulic actuator 7 and at least one auxiliary hydraulic actuator 9 are both actuated, and the highest load pressure of tie primary hydraulic actuator 7 is more than the sum of the load pressure of die auxiliary hydraulic actuator 9 and the desired control pressure differential of the auxiliary hydraulic actuator 9 minus the desired control pressure differential of the primary hydraulic actuator 7.

In this case, due to the load pressure in the control line 29, the two-way valve 24 is switched into its passage position, but nevertheless, the control line 20 is blocked since the two-way valve 23 is blocked due to the load pressure in the control line 25. Controlling the pump pressure and adjusting the control pressure differential to a low control pressure differential is realized in the maimer described with reference to Case No. 2.

Case No. 5: At least one primary hydraulic actuator 7 and at least one auxiliary hydraulic actuator 9 are both actuated, and the highest load pressure of the primary hydraulic actuator 7 is less than the sum of the load pressure of the auxiliary hydraulic actuator 9 and the desired control pressure differential of the auxiliary hydraulic actuator 9 minus the desired control pressure differential of the primary hydraulic actuator 7.

In this case, both two-way valves 23, 24 are opened, and the pump pressure is controlled in the manner described with reference to Case No. 3.

All these cases, as they have been described with reference to FIG. 1, have in common that the pumping pressure is controlled by manipulating the pump pressure. Nevertheless, the desired result, i.e. realizing a predetermined control pressure differential, may be also achieved by manipulating the load pressure, as it is illustrated in FIG. 2.

Figure 2:
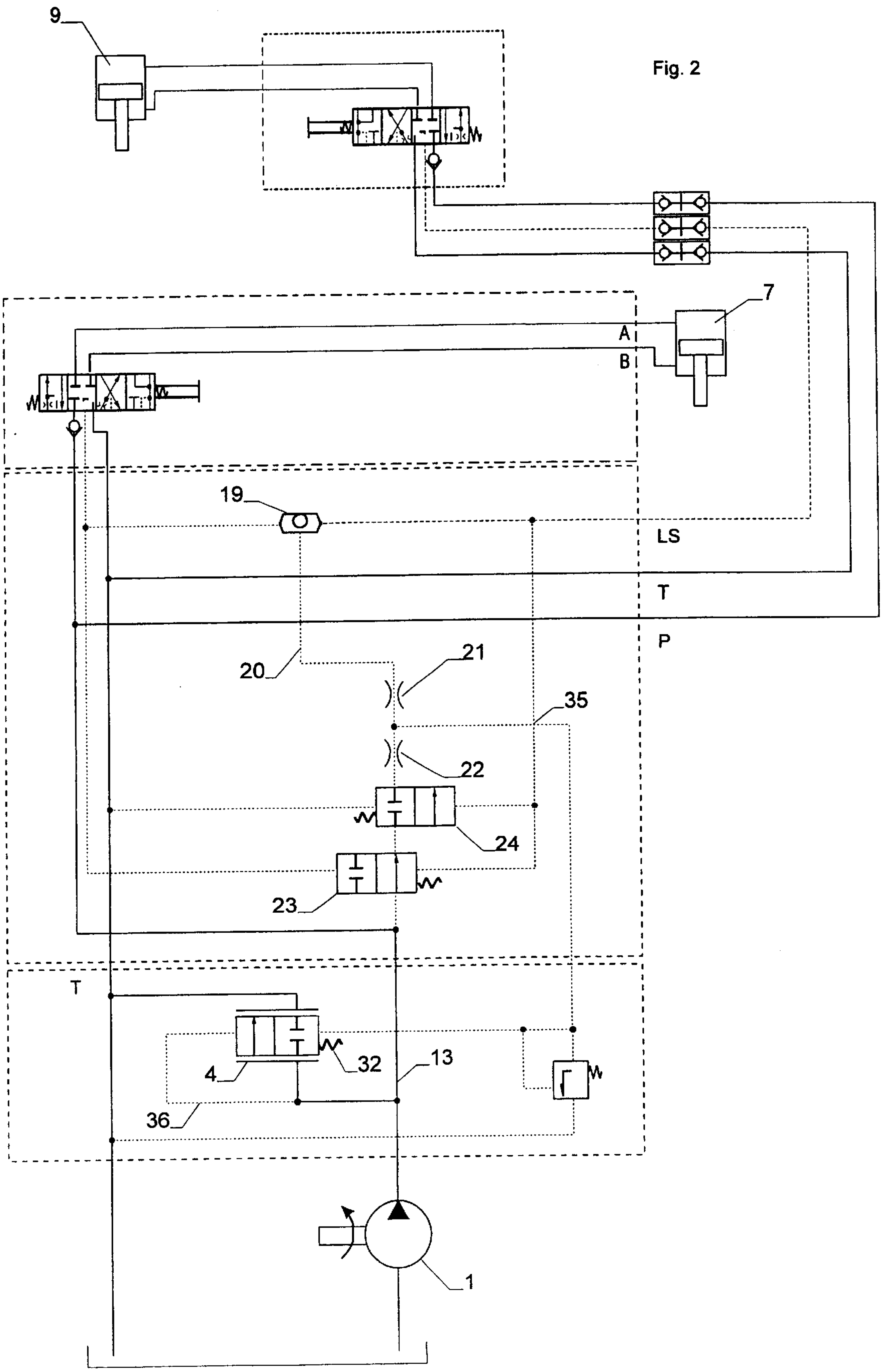
FIG. 2 illustrates a diagram of connections for a hydraulic system in which the pump pressure is controlled by manipulating the load pressure.

Correspondingly, the embodiment illustrated in FIG. 2 substantially differs from the embodiment illustrated in FIG. 1 by the fixed restrictions 21, 22 being arranged downstream of the two-way valves 23, 24 in the control line 20, as it is seen in the direction towards the lower pressure. A control line 35 branches off the control line 20 between the fixed restrictions 21, 22. The pressure of the control line 35, together with the force of the spring 32, is subjected to one side of die unloading valve 4, while the other side of the unloading valve 4 is subjected to pump pressure via the control line 36.

As long as the control line 20 is blocked, as described with reference to Cases Nos. 2 and 4, the pressure of the control line 35 corresponds to the maximum load pressure of the primary hydraulic actuator 7 in the control line 20. Due to a corresponding adjustment of the force of the spring 32, pump pressure exceeding the momentary load pressure by a low control pressure differential prevails. When the control line 20 is in its passage position, as described with reference to Cases Nos. 3 and 5, a higher pressure builds up in the control line 35, the pressure resulting from the pump pressure inside the pressure medium line 13 minus pressure losses by the fixed restriction 22, and the unloading valve 4 provides the higher control pressure differential for the auxiliary hydraulic actuators 9.

What is claimed is:

1. A hydraulic system comprising:

a pump that is adapted to generate a flow of pressurized hydraulic fluid in an outlet line;

an unloading valve that communicates with said outlet line of said pump;

a primary control valve that selectively provides communication between said outlet line of said pump and a primary hydraulic actuator;

an auxiliary control valve that selectively provides communication between said outlet line of said pump and an auxiliary hydraulic actuator;

a first restriction that communicates with said outlet line of said pump;

a second restriction that communicates through a line with said first restriction;

a first two-way valve that communicates with said second restriction;

a second two-way valve that communicates with said first two-way valve; and a shuttle valve having input lines that communicates with said primary and auxiliary control valves and an output line that communicates with said second two-way valve;

wherein said second two-way valve is responsive to the magnitude of the load pressure of said auxiliary hydraulic actuator for selectively providing communication between said first two-way valve and said output line of said shuttle valve;

said first two-way valve is responsive to the magnitude of the load pressure of said primary hydraulic actuator and to the magnitude of the load pressure of said auxiliary hydraulic actuator for selectively providing communication between said second restriction and said second two-way valve; and said unloading valve is responsive to the magnitude of the pressure of the hydraulic fluid in said outlet line of said shuttle valve and to the magnitude of the pressure of the hydraulic fluid in said line providing communication between said first restriction and said second restriction for selectively providing communication between said output line of said pump and a reservoir.

2. A hydraulic system comprising:

a pump that is adapted to generate a flow of pressurized hydraulic fluid in an outlet line;

an unloading valve that communicates with said outlet line of said pump;

a primary control valve that selectively provides communication between said outlet line of said pump and a primary hydraulic actuator;

an auxiliary control valve that selectively provides communication between said outlet line of said pump and an auxiliary hydraulic actuator;

a first two-way valve that communicates with said outlet line of said pump;

a second two-way valve that communicates with said first two-way valve; and a first restriction that communicates with said second two-way valve;

a second restriction that communicates through a line with said first restriction;

a shuttle valve having input lines that communicate with said primary and auxiliary control valves and an output line that communicates with said second restriction;

wherein said second two-way valve is responsive to the magnitude of the load pressure of said auxiliary hydraulic actuator for selectively providing communication between said first two-way valve and said first restriction;

said first two-way valve is responsive to the magnitude of the load pressure of said primary hydraulic actuator and to the magnitude of the load pressure of said auxiliary hydraulic actuator for selectively providing communication between said outlet line of said pump and said second two-way valve; and said unloading valve is responsive to the magnitude of the pressure of the hydraulic fluid in said outlet line of said pump and to the magnitude of the pressure of the hydraulic fluid in said line providing communication between said first restriction and said second restriction for selectively providing communication between said output line of said pump and a reservoir.

* * * * *